July 31, 1945.  R. A. SCHAFER ET AL  2,380,873
INDEXING MECHANISM
Filed March 18, 1942  11 Sheets-Sheet 4
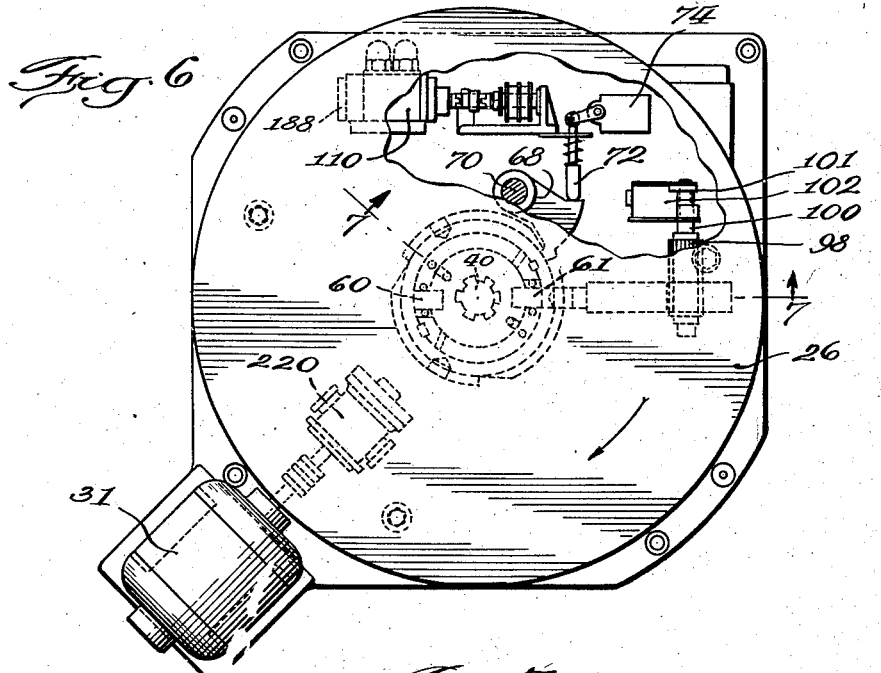
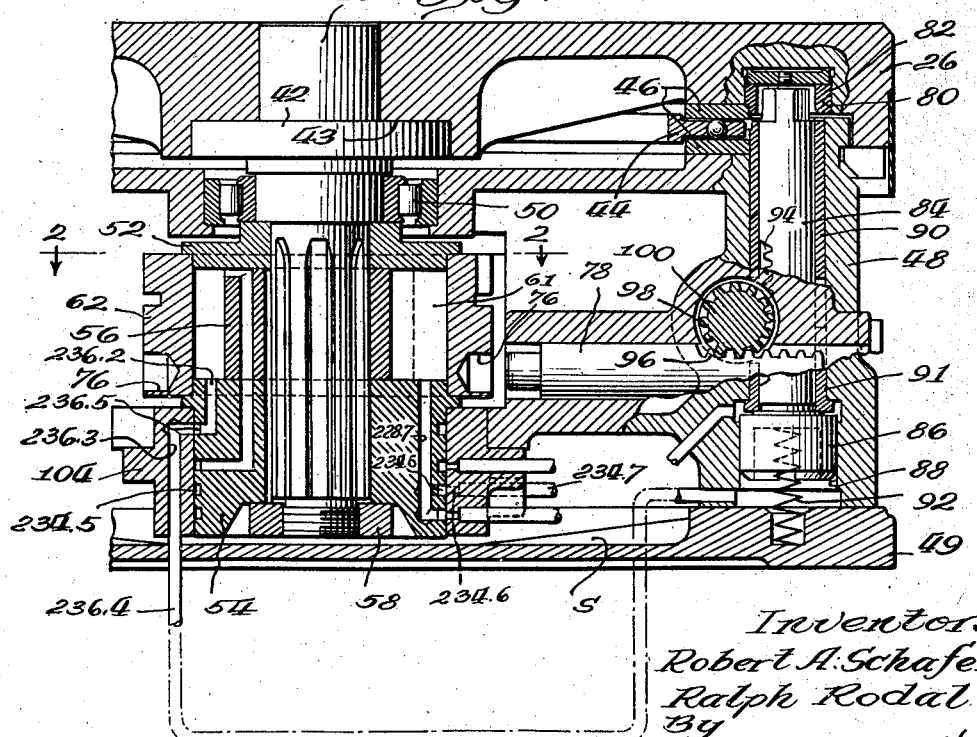
Inventors:
Robert A. Schafer
Ralph Rodal
By
Williams, Bradbury & Hinkle
Attys.

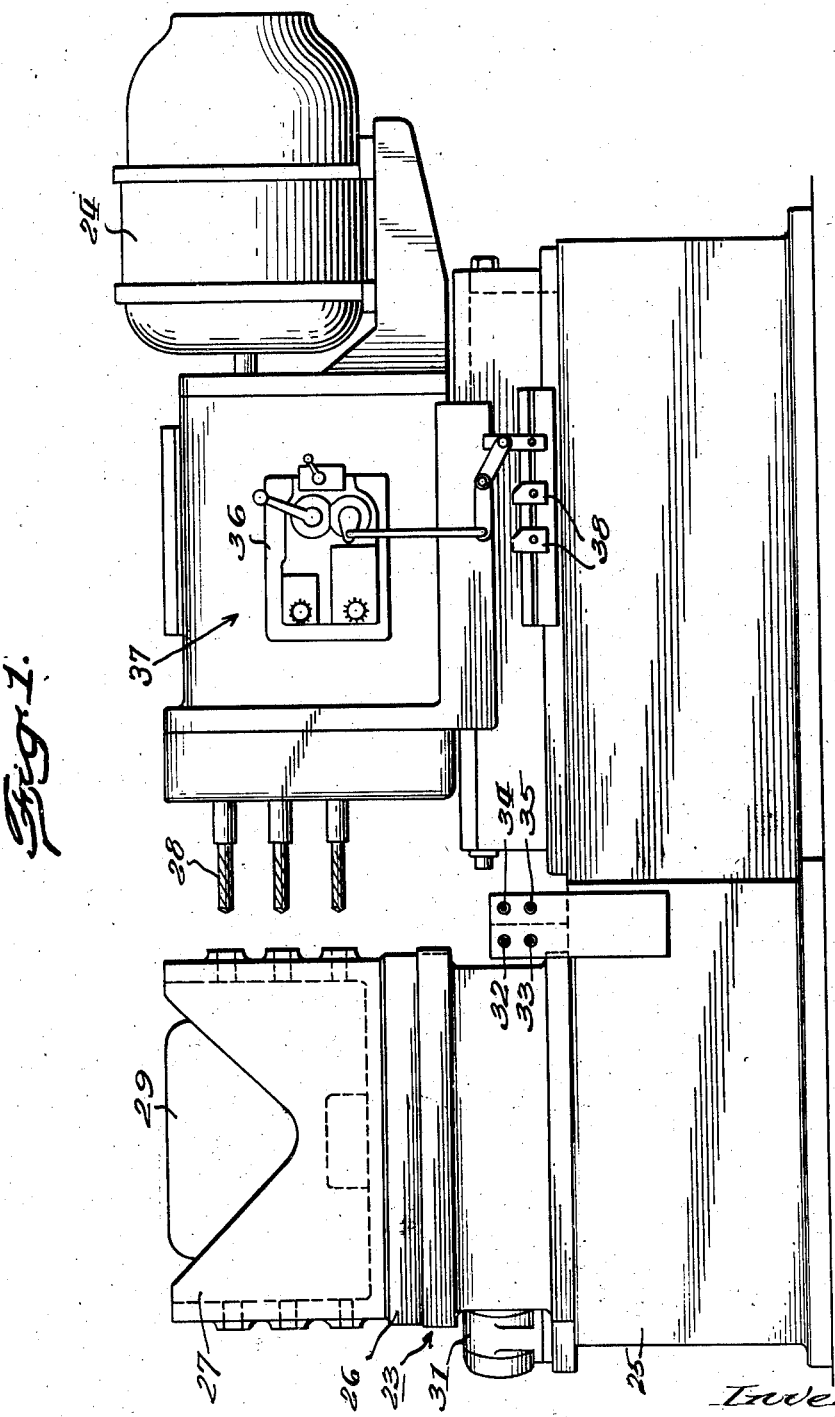

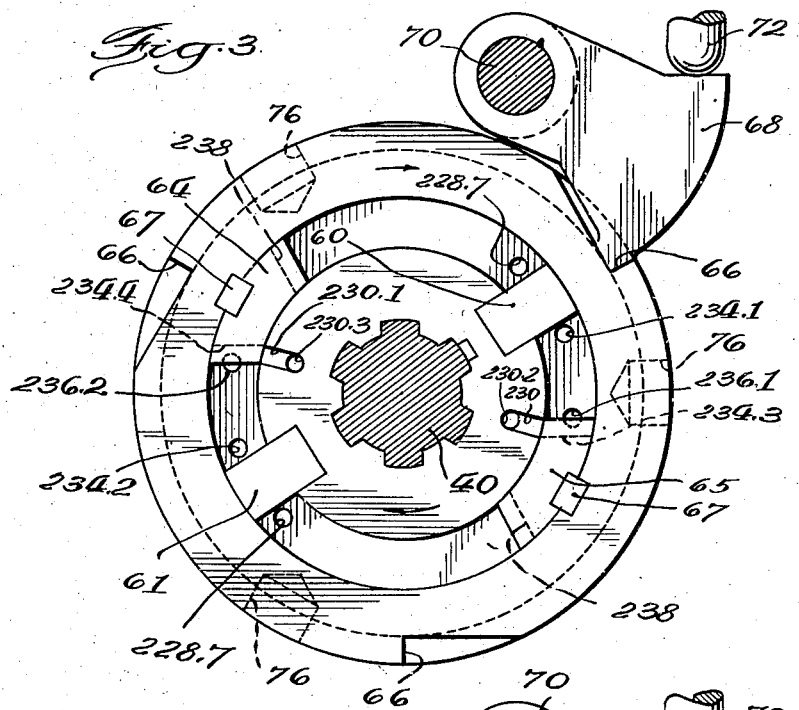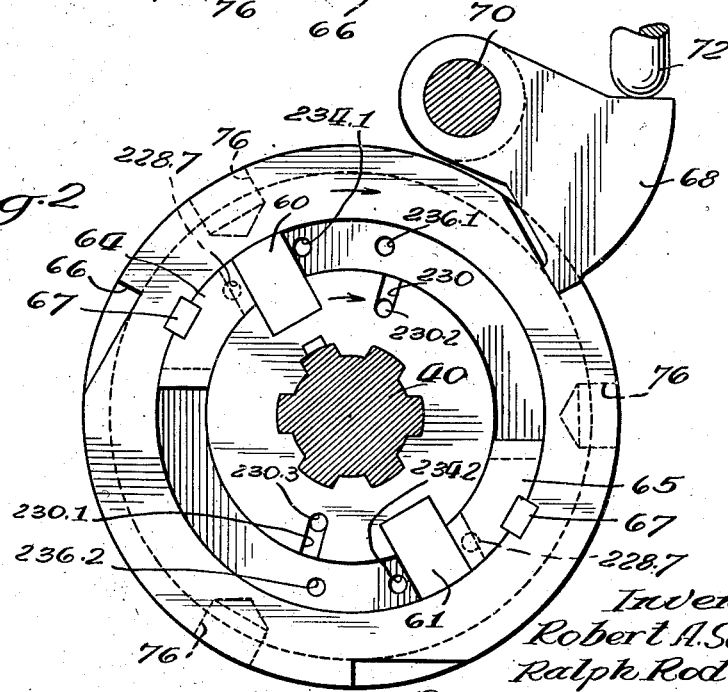

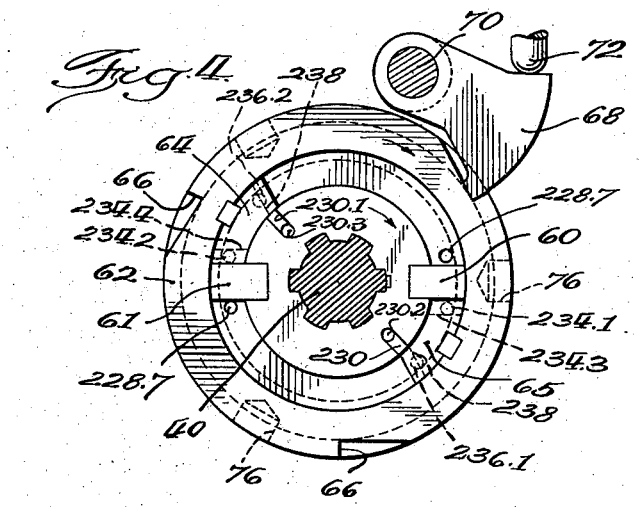
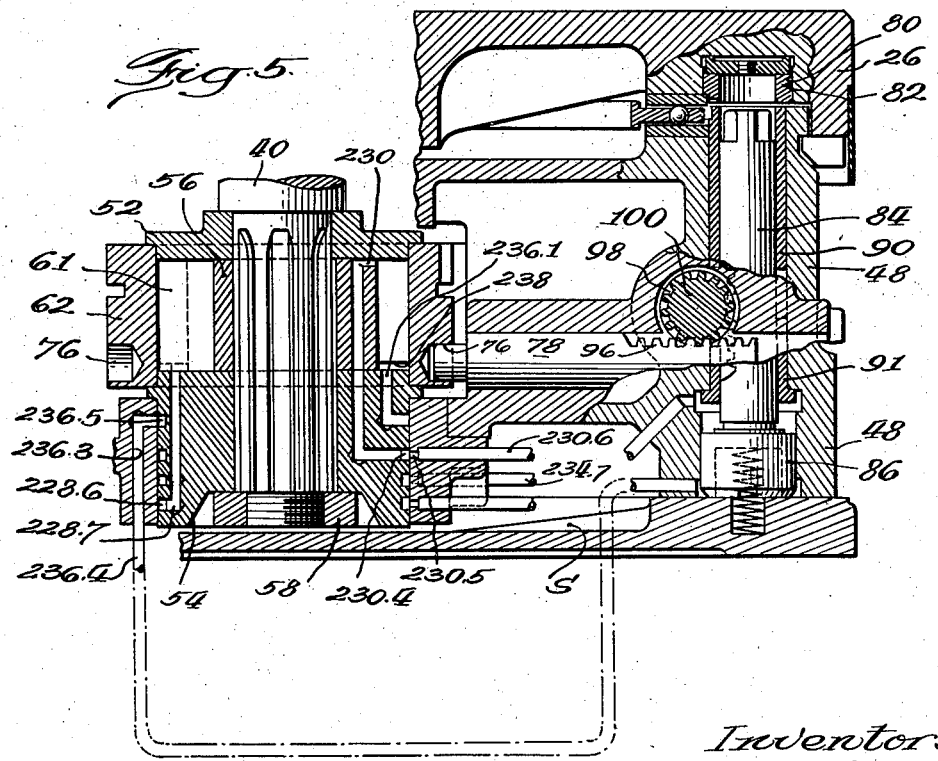

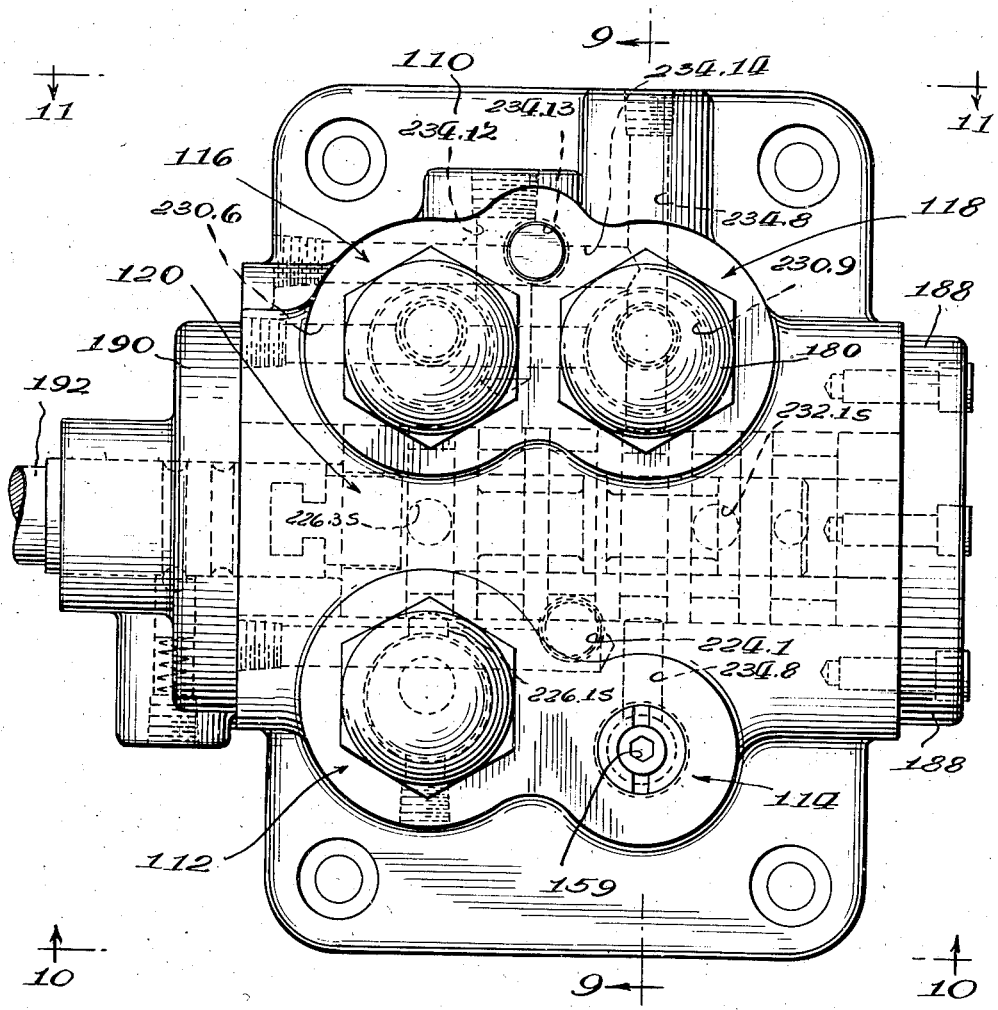

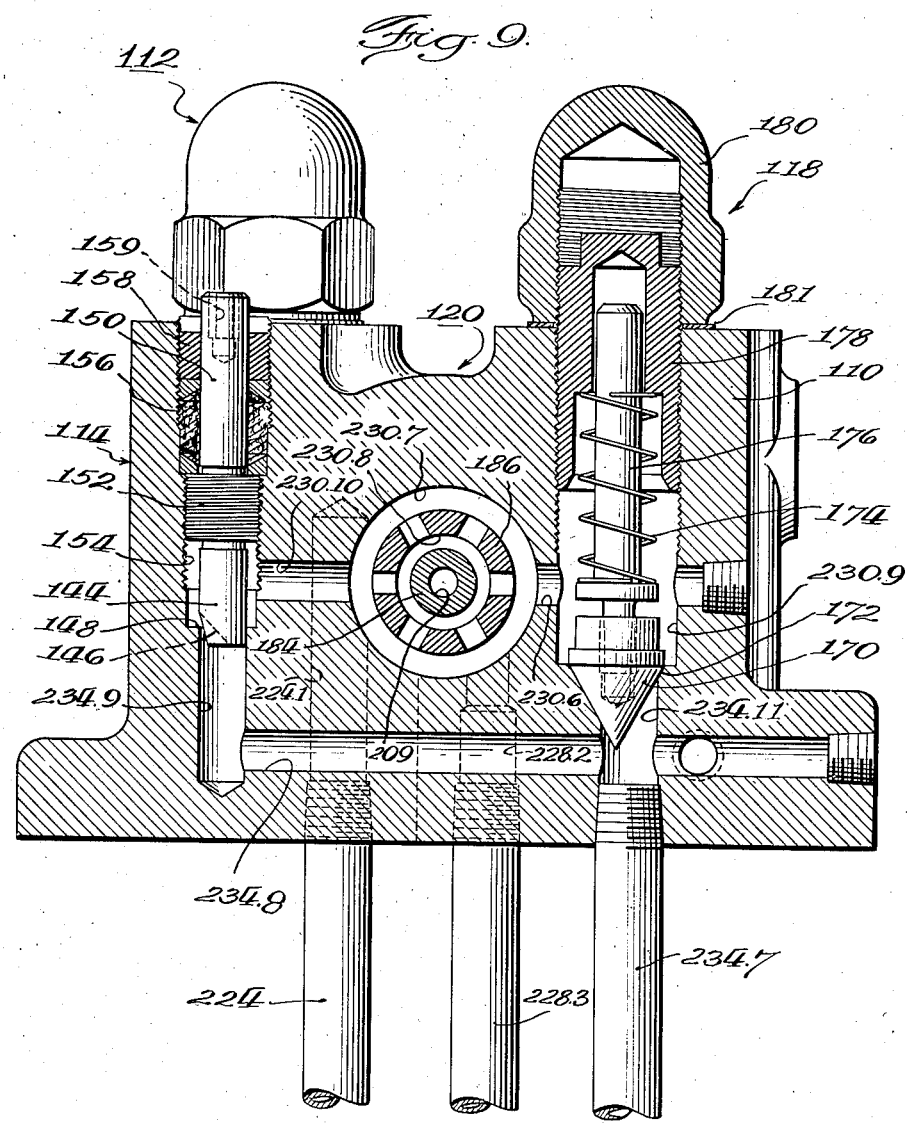

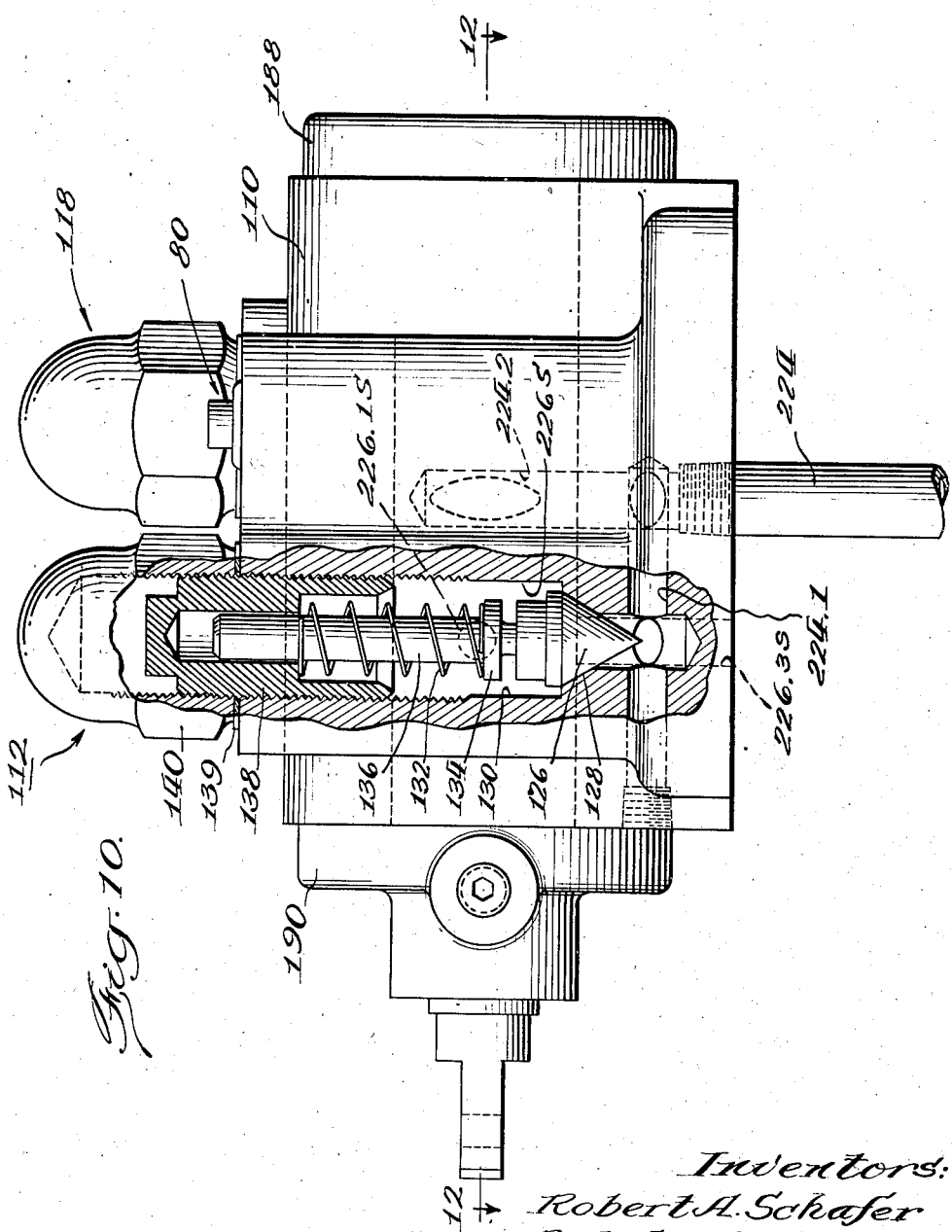

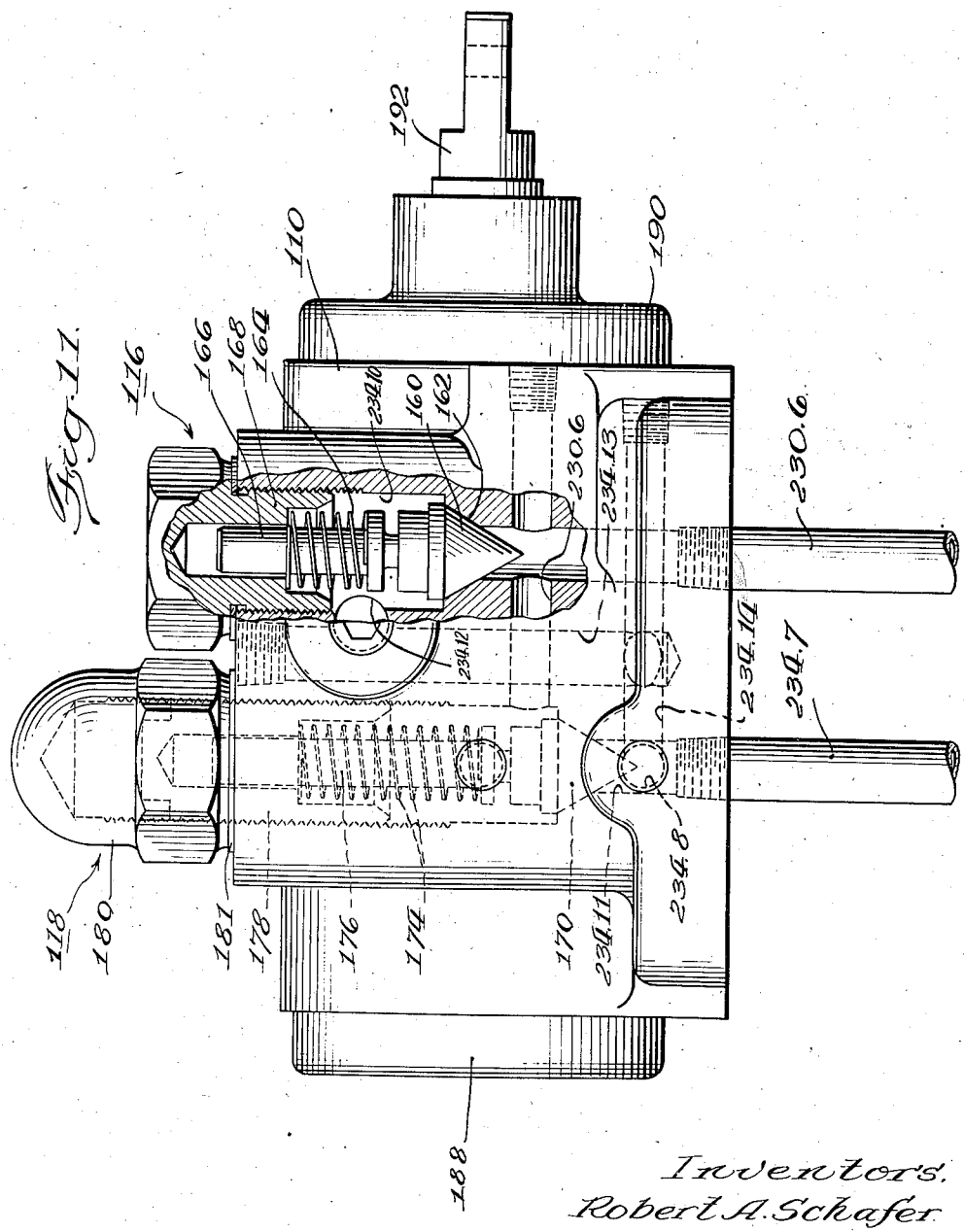

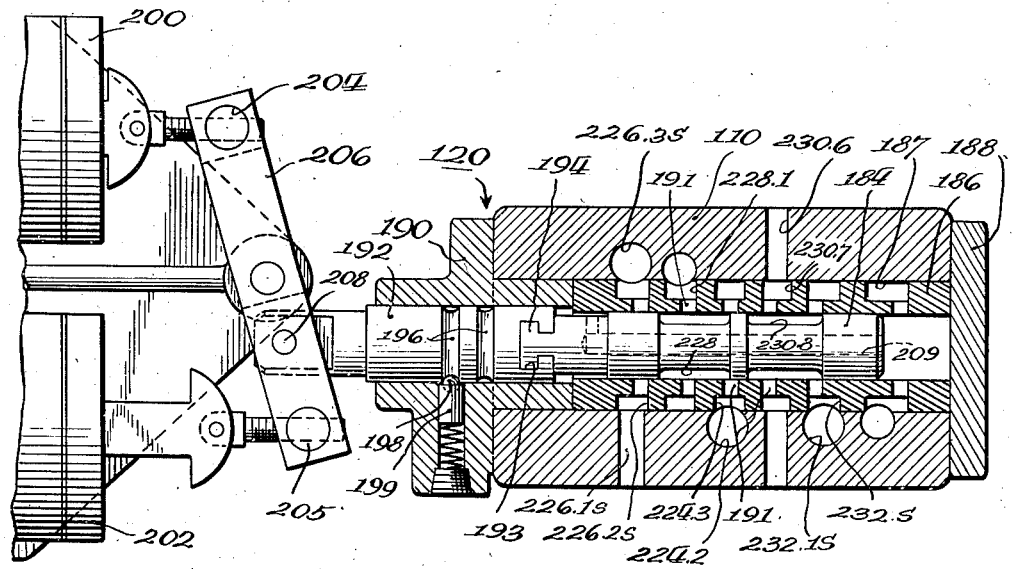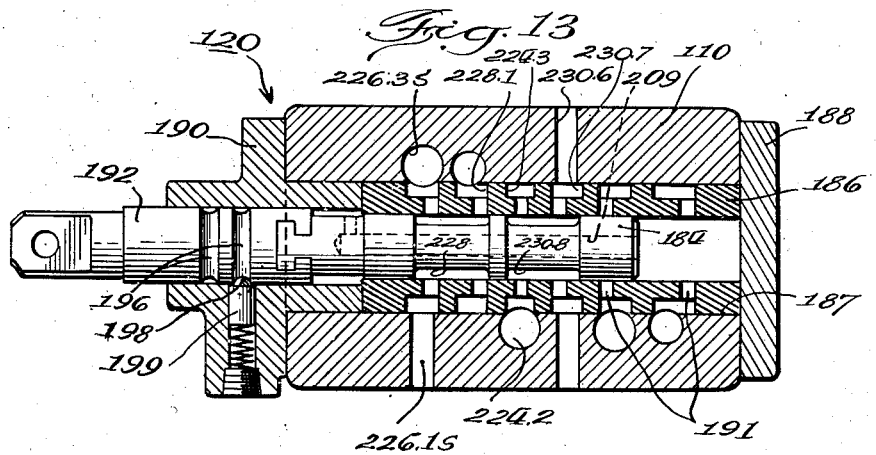

July 31, 1945.  R. A. SCHAFER ET AL  2,380,873
INDEXING MECHANISM
Filed March 18, 1942  11 Sheets-Sheet 10

Inventors.
Robert A. Schafer
Ralph Rodal
By
Williams, Bradbury & Hinkle
Attys.

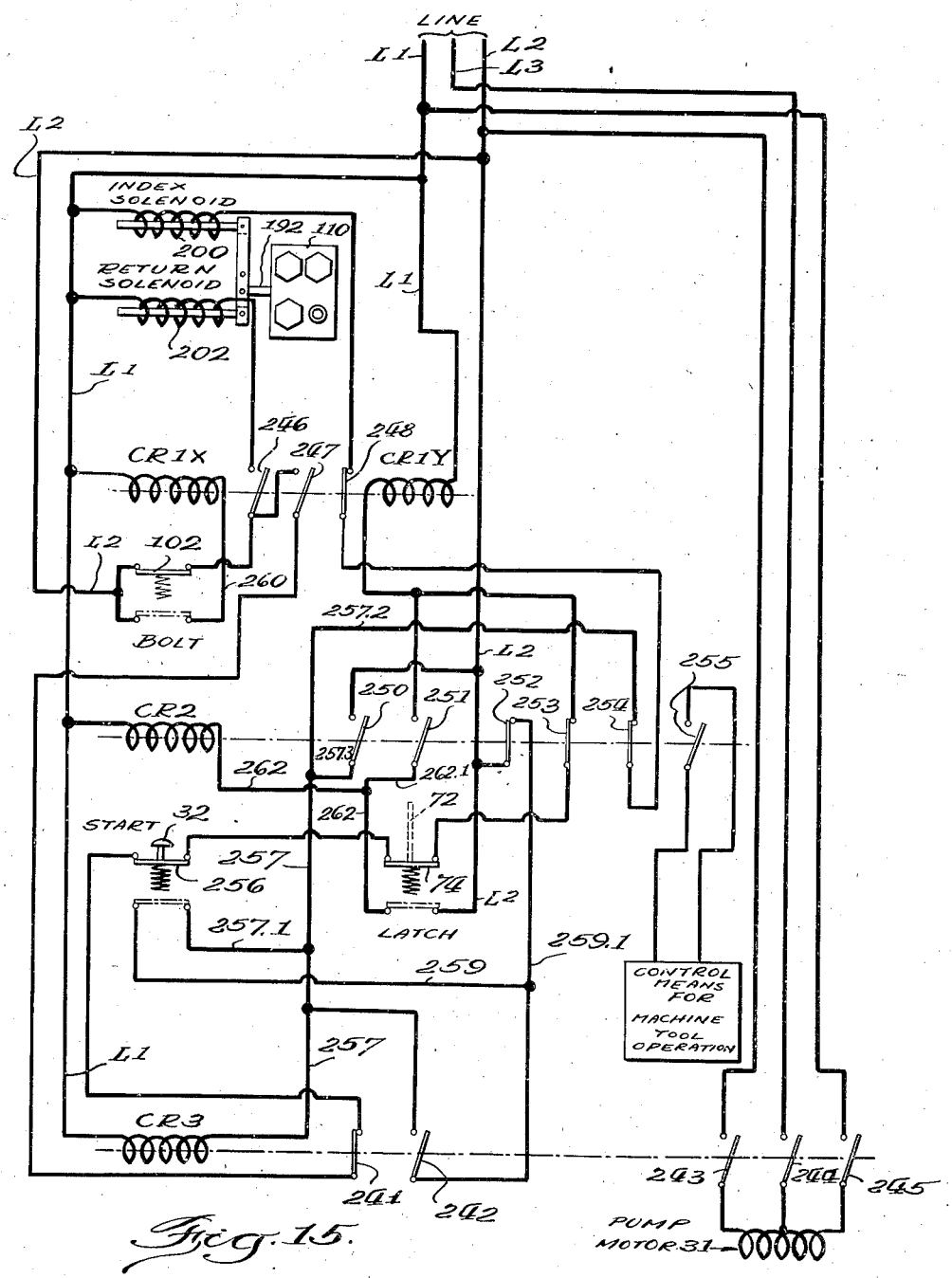

Patented July 31, 1945

2,380,873

UNITED STATES PATENT OFFICE 2,380,873

INDEXING MECHANISM

Robert A. Schafer and Ralph Rodal, Richmond, Ind., assignors to The National Automatic Tool Company, Richmond, Ind., a corporation of Indiana Application March 18, 1942, Serial No. 435,156

12 Claims. (Cl. 77—64)

Our invention relates generally to machine tools, and more particularly to rotary indexing mechanisms usable in various types of automatic, semi-automatic, and hand-controlled machine tools.

The primary object of our invention is to provide an improved hydraulically operated indexing mechanism which is readily adaptable for use as a part of any of a variety of machine tools, which is easily controlled, and which will index rapidly and accurately without shock, and which will have a long useful life.

A further object is to provide an indexing mechanism which is adjustable to determine the rate at which its movement is retarded toward the end of the indexing cycle, to accommodate the mechanism for work and fixtures of different sizes and weights.

A further object is to provide an improved indexing mechanism which may be stopped during the course of an indexing cycle, and which, upon being restarted, will automatically complete the indexing cycle A further object is to provide an improved hydraulic indexing mechanism of the rotary type which may readily be adapted for operation of an indexing table having three or more indexing cycles per revolution.

A further object is to provide an improved electrical control circuit for a hydraulically operated indexing mechanism.

A further object is to provide an improved hydraulic motor mechanism for rotating parts of machine tools.

Other objects will appear from the following description, reference being had to the accompanying drawings, in which:

Fig. 1 is a side elevation of a machine tool embodying the improved indexing mechanism;

Fig. 2 is a horizontal sectional view of the indexing motor, taken substantially on the line 2—2 of Fig. 7;

Figs. 3 and 4 are views similar to Fig. 2, showing the parts in operating positions;

Fig. 5 is a broken vertical sectional view similar to Fig. 7, but showing the parts in positions assumed during an indexing operation;

Fig. 6 is a plan view of the indexing table showing the arrangement of the component parts thereof;

Fig. 7 is a vertical sectional view, taken generally on the line 7—7 of Fig. 6, showing the table locked in indexed position;

Fig. 8 is a plan view of the control valve assembly, portions thereof being broken away, more clearly to illustrate the construction;

Fig. 9 is a transverse sectional view, taken on the line 9—9 of Fig. 8;

Fig. 10 is a side elevational view looking in the direction of the line 10—10 of Fig. 8, portions of the body being broken away to show the details of the pressure valve;

Fig. 11 is a side elevational view, taken on the line 11—11 of Fig. 8;

Fig. 12 is a partly diagrammatic longitudinal sectional view of the directional valve, taken on the line 12—12 of Fig. 10, and showing in addition, portions of the solenoids for actuating the valve, the valve being shown in indexing position;

Fig. 13 is a view similar to Fig. 12, showing the directional valve in return position;

Figure 14:
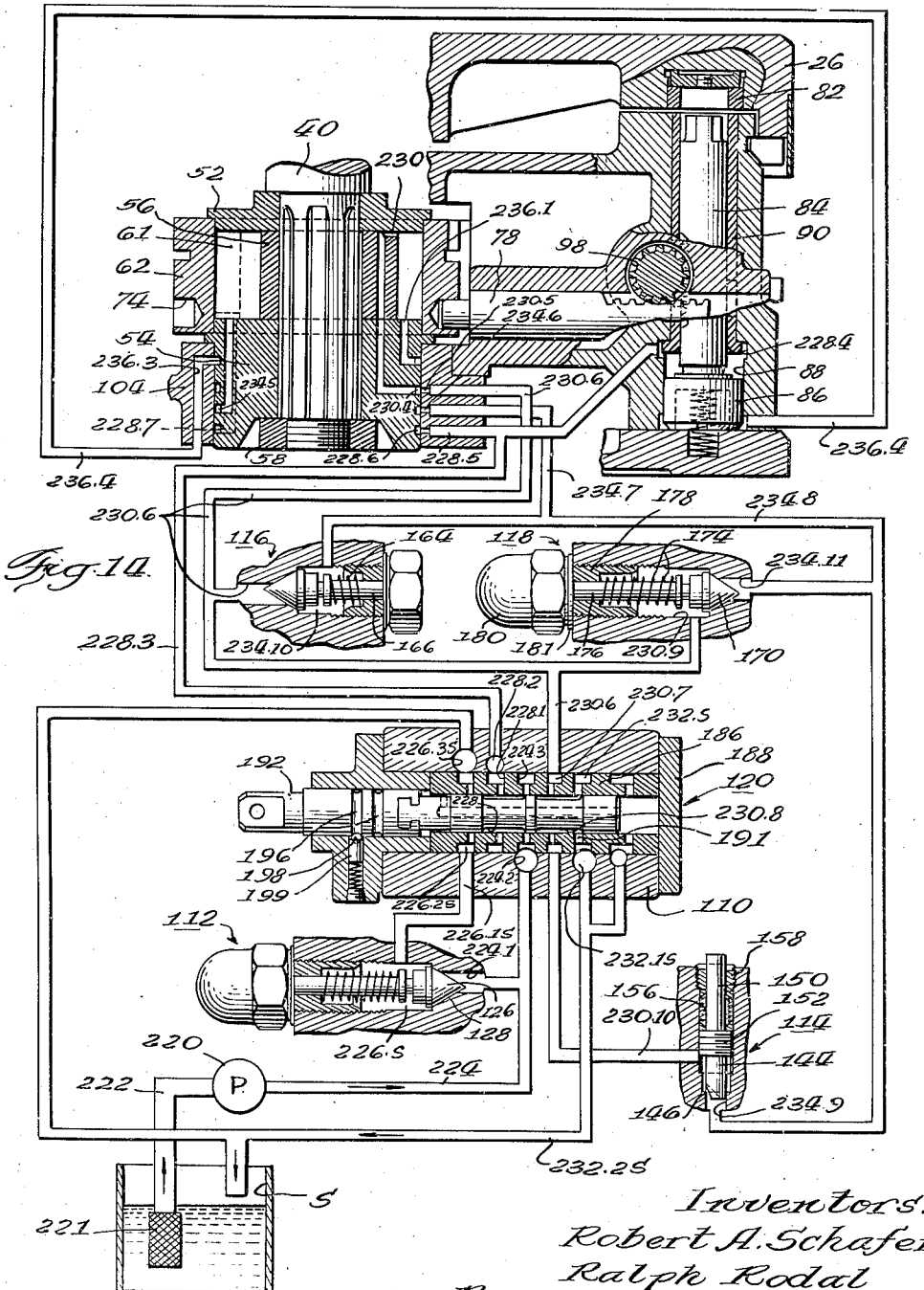
Fig. 14 is a diagram showing the complete hydraulic circuits of the mechanism; and, Fig. 15 is a wiring diagram showing the electrical circuits of the mechanism.

In order that the general features of construction of the indexing mechanism and its advantages over prior art constructions may be more readily understood from the detailed description thereof, it will be preceded by a brief summary of the mechanisms and functions thereof.

In various machine tools, particularly automatic and semi-automatic drilling, boring, tapping, and milling machines, it is the practice to mount the work to be machined in fixtures attached to a rotatable indexing table. Thus, while the machine tools are operating upon the work in one or more of the indexing stations, the finished work may be removed at another station and replaced by a new piece of work to be machined.

It was customary to rotate the indexing table through the required angle by various types of gearing, such as a worm gear, by Geneva movements, or by hydraulic piston and cylinder connected to the table by rack and pinion and usually some kind of clutch or ratchet mechanism. It was usually necessary in these mechanisms to provide some means for locking the table in indexed position, as by means of a "shot bolt." In these mechanisms for rotating the indexing table, it was difficult to apply the forces to start the rotation of the table and to retard it as it approached its indexed position without subjecting the operating parts to excessive strain and wear. As a result, because of the large forces of inertia and momentum which had to be opposed, the operating parts were, generally speaking, very strong and heavy, and thus, expensive. These heavy parts added further to the inertia of the driving mechanism and made it more difficult to secure rapid indexing with smooth acceleration and deceleration.

As distinguished from the cumbersome mechanisms employed to index rotating tables and the like in the past, I have provided a relatively inexpensive apparatus for rotary indexing, in which the forces for securing rotation are hydraulically applied substantially directly to the table without intervening mechanical movements and in which the application of hydraulic power for indexing may be accurately controlled to secure indexing at maximum speed without the sacrifice of smooth acceleration and deceleration, and thus without producing shocks and consequent wear on the mechanism upon initiation and completion of an indexing cycle.

In general, this result is accomplished by constructing the indexing table rigid with one of the elements of a rotary hydraulic motor, the other element of which is in the form of a latch ring which is locked in position while the table is being indexed and which follows up the indexing movement of the table while the table is in locked indexed position. Such operation is controlled by a hydraulic valve mechanism and by electrical control apparatus.

General description

Referring to Fig. 1, the hydraulic indexing apparatus 23 having a rotatory table 26 is secured to the bed 25 of the machine tool, illustrated as a drilling machine. The hydraulic index table is a self-contained unit including an electric motor 31, and may be removed from the machine bed 25 at will. A fixture 27 is secured to the upper surface of the indexing table 26, and may be conformed for guiding drills 28 for cooperation with the work 29 removably secured in the fixture 27.

The operation of the machine is electrically controlled by the operation of push buttons 32, 33, 34, and 35, on a panel suitably mounted upon the bed 25 of the machine. Depression of the push button 32 initiates an indexing cycle of the index table 26; while depression of the push button 33 causes retraction of the tools from the work in case of an emergency, while depression of the push buttons 34 and 35, respectively, starts and stops the operation of the tool driving motor 24.

The character of the forward traverse, feeding, stopping, reverse traverse, and stopping of the head 37 which carries the motor 24 and drills 28, is controlled in part by the positions of cam elements 38 and in part by electromagnetic drives and hydraulic valve mechanism included in a control panel 36 mounted upon the head 37. This panel may be of the general construction disclosed in our copending application Serial No. 339,476, filed June 8, 1940.

Index table operating and locking mechanism

Referring to Figs. 2 to 7, it will be noted that the table 26 is mounted upon a splined shaft 40 having a flanged portion 42 fitted in a suitable recess 43 formed in the lower surface of the table. The table rests upon a ball bearing assembly 44. Suitable thrust bearing plates 46 secured respectively to the table 26 and the frame 48 cooperate with the ball bearing assembly 44 to provide an adequate thrust bearing for the table. A roller bearing assembly 50 forms a central bearing for the shaft 40.

Rigidly secured to the shaft 40 are a cap 52, a manifold 54, and a rotor 56, these parts being held in assembled relation on the shaft 40 by a nut 58. The rotor 56 forms a spacing sleeve between the manifold 54 and the cap 52 and has vanes 60 and 61 fitted in suitably formed slots and conformed to form partitions across the hollow cylindrical space between the rotor 56 and a latch ring 62. The latch ring 62 is rotatable with respect to the shaft 40 and parts carried thereby, and the upper and lower edges thereof fit closely in annular rabbets formed in the cap 52 and manifold 54. The latch ring 62 is provided with a pair of inwardly projecting sectors 64, 65, which are secured to the latch ring by keys 67, and, like the vanes 60 and 61, form partitions across the hollow cylindrical space between the rotor 56 and the latch ring 62.

A plurality of notches 66, in the illustrative example three in number, are provided in the upper peripheral edge of the latch ring 62 and are adapted to cooperate with a latch 68 pivotally mounted upon a shaft 70 and normally urged to engage the notches 66 by a spring-pressed pin 72 which also serves as a means to operate a switch 74.

The latch ring has a plurality of sockets 76, shown as three in number, which are adapted to receive the reduced diameter end portion of a shot bolt 78. As shown in Figs. 5 and 7, the table 26 has a plurality of holes 80 lined with bushings 82 to receive a table-locking shot bolt 84. The shot bolt 84 has a piston 86 at its lower end, which is operable in a cylinder 88 formed in the frame 48. The shot bolt 84 is preferably guided by liner bushings 90 and 91, and is adapted (when not subjected to other forces) to be held in its uppermost position by a compression coil spring 92. Rack teeth 94 are formed in one side of the shot bolt 84, while similar rack teeth 96 are formed in the side of the shot bolt 78, the racks formed thereby meshing with a pinion 98 secured to a shaft 100, which shaft has a cam 101 secured thereto to operate a limit switch 102.

Due to the connection through the pinion 98, it will be clear that when the shot bolt 84 is in position to lock the table 26 against rotation, the shot bolt 78 is removed from the socket 76 of the latch ring, while, when the latch ring is locked by the shot bolt 78, the table 26 will be free to rotate due to the removal of the shot bolt 84 from the socket bushing 82 secured in the table. These shot bolts are operated hydraulically by admitting hydraulic fluid under pressure to the opposite ends of cylinder 88, as will appear hereinafter.

A manifold cap 104 (Fig. 7) is secured to the frame 48 and fits closely about the manifold 54, which is rotatable therein. The various ducts, channels, and conduits shown as formed in or associated with the above described structural parts of the machine will be described in detail in connection with the description of the hydraulic system.

Valve assembly

The various valves forming part of a hydraulic control system are contained in a unitary housing body 110, which is provided with various hereinafter-to-be-described cross-drilled ports and passageways for a pump pressure regulating valve 112, an adjustable aperture valve 114, a check valve 116, a pressure relief valve 118, and a directional valve 120.

Pump pressure valve

The pump pressure valve 112, as best shown in Fig. 10, comprises a poppet valve 126, which is pressed against its seat 128 at the lower end of a bore 130 by a compression coil spring 132. The spring 132 is compressed between a shoulder 134, formed on the pilot pin 136 of the valve, and an adjustable threaded plug 138. A cap 140 is threaded over the outer end of the adjustable plug 138, and is provided with a gasket 139 to seal against the leakage of oil past the threads of the plug.

Adjustable aperture valve

The adjustable aperture valve 114, as shown in Fig. 9, comprises a head 144 provided with a diagonal notch 146 at its extremity to provide an aperture of adjustable size between it and a seat 148. The head 144 is formed integrally with a stem 150 which has a portion 152 threaded in a tapped bore 154. A suitable packing 156, held in place by a kerfed packing gland nut 158, prevents leakage of oil around the stem 150. The outer end of the stem is provided with a socket 159 adapted to receive a suitable tool by which the valve may be adjusted to change the effective area of the aperture provided by the notch 146.

Check valve

The check valve 116, as best shown in Fig. 11, comprises a poppet 160 cooperating with a seat 162 and normally held closed by a compression spring 164 reacting between a flange on a pilot pin 166 and a cap plug 168 threaded in the housing 110.

Relief valve

As shown in Fig. 9, the pressure relief valve 118 comprises a poppet 170 cooperable with a seat 172 and normally held against said seat by a compression coil spring 174 compressed between a flange on a pilot pin 176 and an adjustable screw plug 178 which is threaded in the housing 110. A cap nut 180 is threaded over the outer end of the adjustable screw plug 178, and, with a gasket 181, prevents leakage of the oil past the threads of the screw plug 178.

Directional valve

The directional valve 120 is shown in Fig. 12 in indexing position and in Fig. 13 in the return position, this valve comprising a piston 184, which is slidable in suitably apertured and externally grooved sleeve 186, the latter being secured in a bore 187 formed in the housing 110 by a cap plate 188 and a valve cap 190. Each of the external annular grooves in the sleeve 186 communicates with the bore of the sleeve through a plurality of radial holes 191.

An actuator 192 for the piston 184 is slidable in the valve cap 190 and is provided with a diametrical T-slot 193 to receive a complementally formed tongue 194 formed on the end of the valve piston 184. The actuator 192 has a pair of grooves 196 formed therein for cooperation with a detent ball 198 pressed toward these grooves by a spring-pressed plunger 199. The valve piston 184 is moved from one of its operative positions to the other by an index solenoid 200 and a return solenoid 202, these solenoids having their armatures adjustably connected to pivot pins 204 and 205, respectively, carried by a centrally pivoted bar 206, a pin 208 forming a loose pivotal connection between the bar 206 and the actuator 192. By virtue of this connection between the solenoids 200, 202, and the actuator 192, the solenoids are equally effective in shifting the valve piston 184 between its two operative positions.

The valve piston 184 is provided with a central drilled hole 209 for the drainage of any oil which may leak past the forward end of the valve piston.

Hydraulic control and operating system

In describing the hydraulic circuits, a sequence of the events which occur during a complete indexing cycle will be described, as an incident to a description of the hydraulic circuits. All of the ports, conduits, ducts, etc., which, throughout the course of an operating cycle are always in free communication with one another, will be designated by a common reference number followed by distinguishing decimals, while all such elements which are at all times in free communication with the sump or return, will be designated with a reference character followed by the letter "S," indicating that the oil from such passageway or duct or port may flow freely to the sump.

The arrangement and operation of the hydraulic circuits will be described particularly with reference to Fig. 14, in which a sump S is diagrammatically illustrated as containing the hydraulic fluid, preferably an oil having desirable lubricating properties. As shown in Fig. 5, this sump is physically provided with the base 49 of the frame 48. A constant volume pump 220, driven by the constant speed motor 31 (Figs. 1 and 6) draws the oil from the sump through a strainer 221 and a conduit 222, delivering the oil through a conduit 224 to the inlet passageway 224.1 of pressure valve 112.

Whenever the pressure exceeds a predetermined maximum value, the poppet 126 is displaced from its seat by the pressure and permits flow into a chamber 226S, which is connected by a passageway 226.1S with annular groove 226.2S formed in the directional valve sleeve 186, which is in communication with the sump through a passageway 226.3S. Thus, the pressure in the conduit 224 will never exceed a maximum value predetermined by the adjustment of the spring of the valve 112. One branch of the conduit 224 leads to a passageway 224.2, which communicates with an annular groove 224.3 in the directional valve sleeve 186.

When the hydraulic indexing motor parts are in the position shown in Fig. 2, and the directional valve piston 184 is in its indexing position, as shown in Figs. 12 and 14, oil supplied to the annular groove 224.3 may flow through the associated ports 191 in the sleeve 186 into the space provided by the spool groove 228, which (irrespective of the position of the valve piston 184) is always in communication with an annular groove 228.1 formed in the sleeve 186. The groove 228.1, through duct 228.2 and branched conduit 228.3, communicates with an annular groove 228.4 formed at the upper end of shot bolt cylinder 88, the oil under pressure flowing through this path, lowering the shot bolt 84 and, through the pinion 98, causes the end of the shot bolt 78 to enter one of the sockets 76 in the latch ring 62.

The oil under pressure in the conduit 228.3 also flows through a branch conduit 228.5 in the manifold cap 104 to the lowermost annular groove 228.6 formed in the manifold 54. The annular groove 228.6 communicates through a pair of vertical ducts 228.7 with the spaces between the following faces of the vanes 60 and 61 and the adjacent leading faces of the sectors 64, 65, (Figs. 2 and 3), respectively. The flow of oil into these spaces results in rotating the hydraulic motor rotor 56 clockwise, since the latch ring 62 is held against counterclockwise rotation by the shot bolt 78. The oil in the spaces between the leading faces of the vanes 60, 61 and the following faces of the sectors 65 and 64, respectively, is discharged through ports 230 and 230.1, which, through suitable passageways 230.2 and 230.3, respectively, formed in the rotor sleeve 56 and manifold 54, lead to the annular groove 230.4. The annular groove 230.4 is always in communication with a port 230.5 in the manifold cap 104. A conduit 230.6, connected to the port 230.5, leads to annular groove 230.7 formed in the directional valve sleeve 186, and thence, through ports 191 associated therewith, to the spool groove 230.8. The valve 184, being in the indexing position shown in Figs. 12 and 14, oil may flow from the spool groove 230.8 to the annular groove 232S, formed in the directional valve sleeve 186, to duct 232.1S, which, as illustrated in Fig. 14, communicates with the sump.

Since the oil under pressure is thus applied to the following faces of the vanes 60, 61 and the space adjacent the leading faces of the vanes 60 and 61 is in communication with the sump, the rotor sleeve 56 and the table 26 will be rotated clockwise (at a speed determined mainly by rate of discharge of pump 220) through an angle of approximately 85°. The table will thus have rotated from the position of Fig. 2 toward the position of Fig. 3, at which time, the ports 230.1 and 230.2 begin to be closed off by the sectors 64 and 65, respectively. After these ports have been completely covered by the sectors, as shown in Fig. 3, oil can escape from the space between the leading faces of the vanes 60, 61 and the following faces of the sectors 65, 64, only through ports 234.1 and 234.2. It will be noted that the cylinder spaces ahead of the vanes 60, 61 communicate with the lower end of the shot bolt cylinder 88 (through the path including 236.1, 236.2, 236.3 and 236.4), but any slight pressure which might be generated temporarily in this circuit has no effect because the upper end of the shot bolt cylinder 88 is subjected to full pressure applied through the conduit 228.3.

The ports 234.1 and 234.2 communicate with annular groove 234.5 formed in the manifold 54, the annular groove being in free communication with a port 234.6 in the manifold 104, and to which a conduit 234.7 is connected. The conduit 234.7 has a branch passageway 234.8 leading to the inlet of relief valve 118. (As best shown in Figs. 8 and 11, the chamber 234.10 of check valve 116 communicates with the inlet 234.11 of relief valve 118 through cross-drilled intersecting holes 234.12, 234.13, and 234.14 formed in the valve body 110.) The spring 174 is adjusted so that the relief valve 118 may open only at a pressure higher than that at which the spring 132 permits the pump pressure valve 112 to open. The table 26 and parts rotating therewith, due to their inertia, will usually build up a pressure between the leading faces of the vanes 60, 61 and the following faces of the sectors 65, 64 (as soon as the ports 230, 230.1 are covered), which may considerably exceed that of the oil supplied by the pump 220 and exerted upon the opposite sides of the vanes 60, 61. This excessive pressure is dissipated through flow of the oil, as described, through the conduit 234.8, past the poppet 170 of the relief valve 118 and from the chamber 230.9 and passageway 230.6 to the annular groove 230.7 in the sleeve 186 of the directional valve, spool groove 230.8 to the annular groove 232S and duct 232.1S. The oil may also flow from the conduit 234.8 to the inlet passageway 234.9 of the adjustable aperture valve 112, through the port 146 thereof and passageway 230.10 to the annular groove 230.7, which, as previously indicated, communicates with the annular groove 232S.

The rate at which the rotation of the table is retarded is determined by the weight of the table and work carried thereby and the difference in the hydraulic pressures at which the relief valve spring 174 and the pump pressure valve spring 132 are set to permit their respective valves to open.

Due to the fact that the major portion of the energy due to the inertia of the table and parts rotating therewith is thus dissipated, the speed of rotation of the table descreases to that determined by the rate at which the oil may escape through the adjustable aperture valve 114. The latter valve may be adjusted so that the final rotational movement of the table is at a desired slow rate, with the result that the table comes to rest without shock in the position shown in Fig. 4.

As the table approaches the end of its movement (Fig. 4), ports 236.1 and 236.2, formed in the manifold 54, pass into registry with grooves 238, formed in the leading faces of sectors 64 and 65, and thus permit oil under pressure generated by the pump to flow to annular groove 236.5, formed in the manifold 54, and from this groove, through passageway 236.3 in manifold cap 104 and conduit 236.4 to the lower end of shot bolt cylinder 88. Although both sides of the shot bolt piston 86 are now subject to the same fluid pressure, the effective area of the lower face of the piston 86 is greater than its upper face, and therefore, the piston 86, together with the shot bolt 84, will be urged upwardly so that as soon as the locating bushing 82 comes in alignment with the upper end of the shot bolt, the latter will enter the bushing and accurately locate the table 26 in properly indexed position. Entry of the shot bolt 84 into its locating bushing will result in withdrawal of the shot bolt 78 from the socket 74 of the latch ring 62.

As the shot bolt 84 moves into the locating bushing 82, it actuates the switch 102, which, through electrical circuits hereinafter to be described, energizes solenoid 202 to draw the directional valve piston 184 from the position in which it is shown in Figs. 12 and 14, to the position in which it is shown in Fig. 13.

With the table 26 thus locked in indexed position and the latch ring free to rotate clockwise, oil under pressure from the pump 220 flows through the conduit 224, passageway 224.2, annular groove 224.3 in the directional valve sleeve 186, spool groove 230.8 in directional valve piston 184, annular groove 230.7 and conduit 230.6 to the inlet of the check valve 116, past the poppet 160 of this valve, to chamber 234.10 (through cross-drilled holes 234.12, 234.13, and 234.14) to conduit 234.7, to port 234.6 in manifold cap 104, and from this port through annular groove 234.5 in the manifold 54 to ports 234.1 and 234.2. The ports 234.1 and 234.2 will be in communication with recesses 234.3 and 234.4, respectively, of the sectors 65 and 64, and pressure will thus be applied to the following faces of these sectors to cause clockwise rotation of the latch ring 62.

Oil contained in the space between the leading faces of the sectors 64, 65 and the following faces of the vanes 60, 61, will escape to the sump through passageways 228.7 to annular groove 228.6 in the manifold 54, and from thence flow through conduits 228.5 and 228.3 to the passageway 228.2. The oil from the passageway 228.2 may escape to the sump through the annular groove 228.1 in the directional valve sleeve 186, spool groove 228 in the directional valve 184, and thence through annular groove 226.2S to passageway 226.3S. The latch ring 62 will thus rotate from the position in which it is shown in Fig. 4 to the position in which it is shown in Fig. 6.

It will be noted that in the course of this movement, the sectors 64 and 65 will uncover ports 230.1 and 230, which, through passageways 230.3 and 230.2, annular groove 230.4, port 230.5, and conduit 230.6, are supplied with oil under pressure by the pump. Thus, after the latch ring has moved through an angle represented by slightly less than the arcuate width of its sectors 64, 65, there will be two substantially parallel paths by which oil under pressure is supplied to the spaces adjacent the following faces of the sectors 64 and 65. In addition, there is a further path through which oil may flow from the pump to the spaces following the sectors 64, 65, this path being as follows: From the conduit 224 to passageway 224.2, annular groove 224.3, spool groove 230.8, annulus 230.7, conduit 230.10, through notch 146 in adjustable aperture valve head 144, port 234.9, passageway 234.8, and conduit 234.7, in which the oil merges with that supplied past the check valve 116, as previously described.

As the latch ring 62 moves from the position in which it is shown in Fig. 4 to the position of Fig. 6, it is arrested by the abutment of its sectors 64, 65, with the vanes 60, 61. During such rotation of the latch ring 62, the latch 68 is first swung counterclockwise, and through its push pin 72 is caused to actuate the switch 74. The operation of this switch causes the completion of various electrical circuits through operation of relays, as hereinafter described, and initiates a cycle of operation of the machine tool head.

As the latch ring 62 completes its cycle of rotation and comes to a stop in the position of Fig. 6, the spring-pressed pin 72 forces the latch 68 into the then adjacent notch 66, thereby releasing the limit switch 74, and permitting it to return to normal position. The initial operation of the switch 74, through the associated circuits, causes the motor 24 to operate and initiate a drilling or other machining cycle. When the switch 74 is released as the latch 68 is again forced into a notch 66, electrical circuits are completed and devices operate which result in the deenergization of the pump motor 31 and the reconditioning of the indexing mechanism to its normal starting position.

*Electrical control circuits*

Referring to Fig. 15, the electrical circuits are shown as supplied with power from line conductors L1, L2, and L3. The motor 31 is a three-phase constant speed motor driving the oil pump 220, and is adapted, upon closure of switches 243, 244, and 245, to be connected with the line conductors L2, L3, and L1, respectively. These switches are adapted to be closed upon energization of control relay CR3, which, in addition to these switches, also operates switches 241 and 242. A reciprocatory relay having opposed windings CR1X and CR1Y is adapted to operate switches 246, 247, and 248, while a relay CR2 is adapted to operate switches 250, 251, 252, 253, 254, and 255.

Upon pushing the starting button 32, its switch 256 (in its dotted line position) completes a circuit traced as follows: From L1 through CR3, conductors 257 and 257.1, switch 256, conductors 259 and 259.1, closed switch 252, to line L2. The completion of this circuit results in energization of CR3, which opens switch 241 and closes switches 242, 243, 244, and 245. Closure of the switch 242 completes a holding circuit for the relay CR3 from conductor 257 to conductor 259.1, shunting the switch 256 so that, upon release of the latter, CR3 will remain energized. Closure of the switches 243, 244, and 245, will start the pump motor 31 to initiate a cycle of operation of the hydraulic control mechanism, as previously described.

Depression of the push button also results in the completion of an additional circuit for energizing the index solenoid 200. This circuit is traced as follows: From line L1 through the coil of solenoid 200, switch 248, switch 254, conductors 257.2 and 257.1 start switch 256, conductors 259 and 259.1 and switch 252 to L2.

The energization of index solenoid 200 moves the directional valve 184 to its indexing position, as shown in Figs. 12 and 14.

The hydraulic control mechanism operates as previously described to initiate the indexing cycle, during the first portion of which, it will be recalled, the shot bolt 84 is moved downwardly and moves limit switch 102 from its full line to its dotted line position, as shown in Fig. 15, and holds it in this position. Such operation of the switch 102 completes a circuit from L1 through relay winding CR1X, conductor 260, and switch 102 to L2. Energization of relay CR1X results in closure of switches 246 and 247 and opening of switch 248. It will be recalled that switch 248 is in the circuit for the energization of the solenoid 200. Opening of the switch thus deenergizes the index solenoid 200, but the directional valve 184 is maintained in its indexing position by the detent 198 (Fig. 12).

When the table 26 has completed its indexing movement, the shot bolt 84 is again raised, as previously described, and enters its socket 82. Such movement of the shot bolt results in return of the limit switch 102 to its full line position (Fig. 15), and this completes a circuit from line L1 through the winding of the return solenoid 202, switches 246 and 102, to L2. The energization of the return solenoid 202 shifts the directional valve piston 184 from the position in which it is shown in Fig. 12 to the position in which it is shown in Fig. 13 (being held in the latter position by its detent 198), thus initiating operation of the latch rotating portion of the cycle, as above described.

As the latch ring 62 commences rotating clockwise, the latch 68 will be cammed outwardly (counterclockwise) and ride on the peripheral cylindrical surface of the latch ring. Such counterclockwise swinging of the latch 68 through pin 72 will actuate switch 74 to cause the latter to move from the full line to the dotted line position shown in Fig. 15. Such operation of the switch 74 will complete a circuit as follows: From L1 through the winding of control relay CR2, conductor 262 to switch 74 and hence to L2.

Energization of CR2 will result in closure of switches 250, 251, and 255 and opening of switches 252, 253, and 254.

Closure of the switch 250 results in establishing a substitute holding circuit for relay CR3, which may be traced as follows: L1, CR3, conductors 257 and 257.3, switch 250 to L2. (The relay CR3 is sufficiently slow acting so that it will not operate during the minute interval between the opening of switch 252 and the closing of switch 250.)

Closure of the switch 251 results in energization of the relay winding CR1Y through the following circuit: From L1 through CR1Y to switch 251, conductors 262.1 and 262, switch 74, to L2. Energization of CR1Y results in opening switches 246 and 247 and closing switch 248. (Closure of switch 248 does not result in energization of index solenoid 200 because switch 254 in series therewith is open.)

Closure of the switch 255 completes a circuit forming part of the controls for the head carrying the cutting tools, and results in the starting of an operating cycle of the tools.

As the latch ring completes its rotational movement, the latch 68 is swung clockwise into the then adjacent notch 66 by its spring-pressed latch pin 72 (Fig. 6), which permits limit switch 74 to return from its dotted line to its full line position (Fig. 15). Such operation of the switch 74 results in deenergization of the relay CR2, with consequent opening of the switches 250, 251, and 255, and closure of switches 252, 253, and 254. Opening of the switch 250 results in deenergization of the relay CR3, stopping pump motor 31 by opening switches 243, 244, and 245. Relay CR1Y is also deenergized due to the opening of switch 251. The electrical parts of the system thus complete one cycle of operation, and are in condition to start the next cycle.

The following résumé of the operation of the principal parts of the apparatus is provided to correlate the foregoing description of the operation of the electrical and hydraulic controls:

1. The operator presses push button 34, starting the motor 24, conditioning the machine tool for operation;

2. The operator presses push button 32 to start an indexing cycle, which, upon energization of relay CR3, causes the pump motor to start, establishing a holding circuit for CR3, and causes indexing solenoid to be energized, and thus to move the directional valve 184 to indexing position;

3. The shot bolt 84 moves down, operating switch 102 to energize CR1X;

4. Table 26 commences rotation until retarded by closure of ports 230 and 230.1;

5. Table continues rotation at speed determined by setting of adjustable aperture valve 114;

6. Ports 236.1 and 236.2 are uncovered, causing the shot bolt 84 to be forced upwardly and finally to stop and lock the table when it arrives at its indexed position;

7. Raising of shot bolt releases switch 102, deenergizing CR1X, which results in deenergization of index solenoid 200 and energization of return solenoid 202;

8. The latch ring 62 commences rotating, camming latch 68 outwardly to operate switch 74, thereby energizing CR2;

9. Energization of CR2 establishes the substitute holding circuit for CR3 and energizes CR1Y and also opens the first holding circuit for CR3, opens the circuit for index solenoid 200, and causes the machine tool to start an operating cycle;

10. As the latch ring completes its rotation with the sectors 64, 65 thereof abutting the vanes 61 and 60, the latch 68 is forced into one of the notches 66 and releases switch 74;

11. Release of the switch 74 results in deenergization of CR3, reconditioning the starting push button circuit, completing a circuit to the index solenoid 200, and opening the machine tool control circuit, and, by the deenergization of CR3, stopping the pump motor 31 and also completing the return to normal of all the electrical switches;

12. The machine tool continues through its machining cycle and stops upon completion thereof, all parts being in normal position.

It will be seen from the foregoing that our invention provides a very satisfactorily operating means for indexing a machine tool work carrying table. The hydraulic fluid used in the system is preferably one having good lubricating qualities so that most of the moving parts of the apparatus require no further provision for lubrication. It will be noted that the outlets 230 and 231.1 are at the top of the pressure chambers of the hydraulic motor so that any leakage of air into the system will be forced from these chambers during the first portion of the indexing cycle. This automatic elimination of air from the hydraulic system is assurance that the speed of rotation of the table will be smooth under the compact control of the applied hydraulic pressure and the valves designed to control its speed.

If desired, the indexing apparatus may be electrically coupled to the machine tool so as to cause it to start an indexing cycle immediately upon the completion of the cycle of operation of the machine tool head, such coupling being readily effected by providing a solenoid operated switch in parallel with the push button operated starting switch 256, the solenoid being energized only upon completion of the operating cycle of the machine tool head.

It will be observed that the index table starts rotation smoothly at a constant rate of acceleration, since the hydraulic motor delivers the oil thereto at a constant pressure. During the major portion of the cycle, the rotor will be driven at a constant angular speed, since the oil is supplied by a pump driven at a constant speed. The latter portion of the movement of the rotor is smoothly retarded at a rate initially determined by the adjustment of the pressure relief valve 118 and thereafter by the adjustment of the adjustable aperture valve 114. The latter valve is adjusted to assure the retardation of the table irrespective of the weight of the fixtures and work pieces carried by the table, the valve being adjusted for a smaller aperture with increased rotary moment of inertia of the rotor, the table, and the parts carried thereby.

The hydraulic indexing motor is preferably constructed as illustrated so as to be symmetrical about a plane passing through the axis and diameter of the rotor so that the motive and retarding forces applied to the rotor form a balanced couple, which is, of course, of advantage in minimizing wear upon the relatively moving parts. When the mechanism is constructed for a table having more than three indexing positions per revolution (each index cycle being of less than 120° in angular extent), the hydraulically balanced relationship is preferably maintained, preferably by increasing the angular widths of the vanes 60, 61 or of the sectors 64, 65.

Furthermore, it will be clear that the construction may be altered so that the table is secured to the latch ring 62 instead of to the rotor 56, it being understood that suitable changes would be made in the construction and design of the parts so as to cause the apparatus to function in the same general manner as described above.

The hydraulic motor and its associated hydraulic mechanism may readily be made of such size that it may be located within the space beneath the indexing table, thus reducing the amount of floor space required for the machine. The indexing mechanism is substantially a self-contained unit (being connected with the operating mechanism of the machine tool head only through electrical control circuits). The indexing table and apparatus may readily be removed from the machine tool bed and replaced thereon with the expenditure of a minimum of time and effort.

A careful consideration of the hydraulic and electrical circuits and positions of the various valves and relays during the course of a cycle of operation will reveal the fact that the indexing cycle may be interrupted and stopped at any point in the cycle, after which its cycle may be resumed without any difficulty and complete the operating cycle which was interrupted. This is of particular advantage during set-up of the machine and also in event of power shut-off or failure.

In other forms of indexing mechanisms, the difficulty was encountered that the mechanism or its controls were such that trouble was encountered if the table stopped at a certain point or points in the indexing cycle. For example, in indexing mechanisms driven through a Geneva type movement, if the indexing operation is topped midway in the cycle, the mechanism has such poor driving torque characteristics that it is difficult, or impossible, to restart without the application of additional forces to the table. Similarly, in hydraulically operated indexing mechanisms utilizing spring-set valves in the hydraulic circuit, a drop in the hydraulic pressure will usually cause a change in the setting of the valves to take place at the incorrect time in the cycle, so that, upon resumption of the supply of hydraulic fluid at proper pressure, the mechanism will operate in a faulty manner, if at all.

Because of the use of latched relay CRIX, CRIY, and because of what might, upon first examination, be considered the relatively complicated relay and circuit arrangement, the indexing mechanism will, following an interruption in the supply of electrical power, immediately resume the indexing cycle at the point in the cycle at which it was interrupted, and will continue in operation in the intended manner until the indexing cycle has been completed. Even if the latched relay CRIX, CRIY is manually moved, it will not cause a stoppage which will not automatically correct itself when restarted.

While we have shown and described a particular embodiment of our invention, it will be apparent to those skilled in the art that numerous modifications and variations may be made without departing from the underlying principles of the invention. We therefore desire, by the following claims, to include within the scope of our invention all such modifications and variations by which substantially the results thereof may be obtained by the use of substantially the same or equivalent means.

Having thus described our invention, what we claim as new and desire to secure by Letters Patent of the United States is:

1. In an indexing mechanism for a machine tool having a source of fluid under pressure and a part to be rotatably indexed, the combination of a support, a rotor element mounted for rotation with respect to said support, a cylinder element mounted for rotation with respect to said support and relative to said rotor element, said elements together forming an annular chamber, a plurality of partitions dividing said annular chamber into a plurality of separate compartments with alternate partitions carried by said rotor element and the intermediate partitions carried by said cylinder element, a driving connection between one of said element and the part to be indexed, interlocking means to hold one of said elements stationary while the other is free to rotate and vice versa, control valve means operable in one position to provide connections to admit fluid from said source to a compartment on one side of a partition carried by the one of said elements which is not locked by said locking means and permitting relatively free discharge of fluid from the compartment on the opposite side of said partition, said control valve means being operable in another position upon reversal of said interlocking means to reverse the connections to said compartments, whereby said rotor element and cylinder element may be alternately rotated in the same direction through equal angles, and means rendered effective prior to the completion of the rotary movement of one of the elements connected to said part to restrict said relatively free discharge of fluid and thereby retard the movement of said element and part, said last-named means comprising a check valve loaded to open only at a pressure exceeding that of said source, and means providing a small flow resistant orifice.

2. In a mechanism for a machine tool having a source of fluid under pressure and a part to be rotated through an angle of less than 180°, the combination of a support, a rotor element mounted for rotation with respect to said support, a cylinder element mounted for rotation with respect to said support and relative to said rotor element, said elements together forming an annular chamber, a plurality of partitions dividing said annular chamber into a plurality of separate compartments with alternate partitions carried by said rotor element and the intermediate partitions carried by said cylinder element, a rigid driving connection between one of said elements and the part to be indexed, shot bolts interconnected for alternate operation to hold one of said elements stationary while the other is free to rotate and vice versa, control valve means operable in one position to provide connections to admit fluid from said source to a compartment on one side of a partition carried by the one of said elements which is not locked by said locking means and permitting relatively free discharge of fluid from the compartment on the opposite side of said partition, said control valve means being operable in another position to reverse the connections to said compartments, whereby said rotor element and cylinder element may be alternately rotated in the same direction through equal angles, and means to reverse the positions of said shot bolts upon completion of the rotative movement of each of said elements.

3. The combination set forth in claim 2 in which said last named means comprises valves formed by cooperating surfaces of said elements.

4. The combination set forth in claim 2 in which the movement of the shot bolts to one position causes shifting of said control valve means to a different position.

5. A hydraulic motor for a machine tool indexing mechanism, comprising a rotor, means for supporting said rotor for rotation, said means including hydraulic passageways connecting said supporting means and said rotor effective to transmit hydraulic fluid under pressure irrespective of the position of said rotor, a cylinder member mounted for rotation about a portion of said rotor and radially spaced therefrom to form an annular chamber, cooperating vanes secured respectively to said rotor and said cylinder member and forming partitions dividing said annular chamber into a plurality of compartments, hydraulic valve means operable to admit a hydraulic fluid under pressure to alternate compartments of said annular chamber and to permit substantially free discharge of the hydraulic fluid from the intermediate compartments, thereby to cause rotation of said rotor, locking means effective alternately to hold said rotor and said cylinder member from rotation in either direction, and means effective after said rotor has been rotated through a predetermined angle to cause said locking mechanism to lock said rotor and to permit rotary motion of said cylinder member, means operable thereafter to operate said valve to reverse the hydraulic connections to the compartments of said annular chamber, thereby to cause said cylinder member to rotate in the same direction that said rotor operated and through an equal angle.

6. An indexing mechanism for a machine tool having an index table, a support, a hydraulic motor having two relatively movable parts mounted for rotation with respect to said support, said parts rotating alternately in the same direction during the operation of said motor, a rigid driving connection between one of said parts and said table, a locking element for said table and the part connected thereto, a locking element for the other of said parts, and an interlocking connection between said locking elements to prevent one of said elements from being moved to ineffective position prior to the movement of the other locking element to effective position.

7. The combination set forth in claim 6 in which there is provided means responsive to the relative positions of said parts for actuating said locking elements.

8. In an indexing mechanism for machine tools, the combination of a rotary hydraulic motor including two parts alternately rotatable in the same direction, a hydraulic valve determining by its position which of said two parts is to be rotated, locking mechanism to lock one of said parts while the other is being rotated, hydraulic means for operating said locking mechanism in response to the relative positions of said parts, and electromagnetic means to shift said valve from one position to another position, and means controlled by said locking means to energize said electromagnetic means.

9. In a hydraulic motor mechanism, a stationary manifold having a bore extending therethrough and a plurality of passageways terminating at said bore, a rotor having a portion extending into said bore and rotatable with respect to said manifold, said rotor portion having a plurality of external annular grooves respectively in communication with said passageways, a cylinder member mounted for rotation with respect to said rotor and forming with said rotor an annular chamber, partitions secured alternately to said rotor and to said cylinder member and dividing said chamber into separate compartments, said passageways utilized for the discharge of the hydraulic fluid from said compartments extending to the tops of the compartments to facilitate the purging of air therefrom, and ducts connecting said annular passageways with said compartments, said ducts, annular grooves, and passageways forming paths for flow of a hydraulic power fluid into and from said compartments.

10. In a machine tool having an element to be rotated, the combination of a hydraulic motor having a pair of independently and relatively rotatable parts having surfaces forming a plurality of chambers normally filled with a hydraulic fluid and expanding and contracting upon relative rotation of said parts, means connecting said machine element to one of said parts, positive bi-directional locking means operable to hold said parts alternately against movement, said locking means operating only when said parts are stationary and in predetermined positions, valve means for admitting a hydraulic fluid under pressure to one of said chambers and discharging fluid from another of said chambers, and vice versa, thereby alternately to rotate said parts in the same direction, and means for coordinating the operation of said valve means and said locking means.

11. In a machine tool having a part to be intermittently rotated through an angle of 180° or less, a hydraulic motor having a rotor connected to said part, a rotary cylinder member forming part of said motor and rotatably mounted on said rotor, said member forming an annular space between it and said rotor, partitions extending across said annular space and respectively attached to said rotor and said cylinder member, means to supply a hydraulic fluid under pressure to a portion of said annular space on one side of one of said partitions attached to said rotor and permitting discharge of the hydraulic fluid from the portion of said space on the opposite side of said partition, thereby to cause rotary movement of said rotor, means to hold said cylinder member against movement while said rotor is being rotated, and hydraulically operating means to retard said rotor as it approaches completion of its rotary movement.

12. In a mechanism for a machine tool having a source of fluid under pressure and a part to be rotated through an angle of less than 180°, the combination of a support, a rotor element mounted for rotation with respect to said support, a cylinder element mounted for rotation with respect to said support and relative to said rotor element, said elements together forming an annular chamber, at least four partitions dividing said annular chamber into at least four separate compartments with alternate partitions carried by said rotor element and the intermediate partitions carried by said cylinder element, a rigid driving connection between one of said elements and the part to be indexed, shot bolts interconnected for alternate operation to hold one of said elements stationary while the other is free to rotate and vice versa, control valve means operable in one position to provide connections to admit fluid from said source to two diametrically opposite compartments on corresponding sides of the partitions carried by the one of said elements which is not locked by said locking means and permitting relatively free discharge of fluid from the compartments on the opposite sides of said partitions, said control valve means being operable in another position to reverse the connections to said compartments, whereby said rotor element and cylinder element may be alternately rotated in the same direction through equal angles by hydraulic pressure applied equally upon partition surfaces upon opposite sides of the axis of rotation, and means to reverse the positions of said shot bolts upon completion of the rotative movement of each of said elements.

ROBERT A. SCHAFER.
RALPH RODAL.